UNITED STATES PATENT OFFICE.

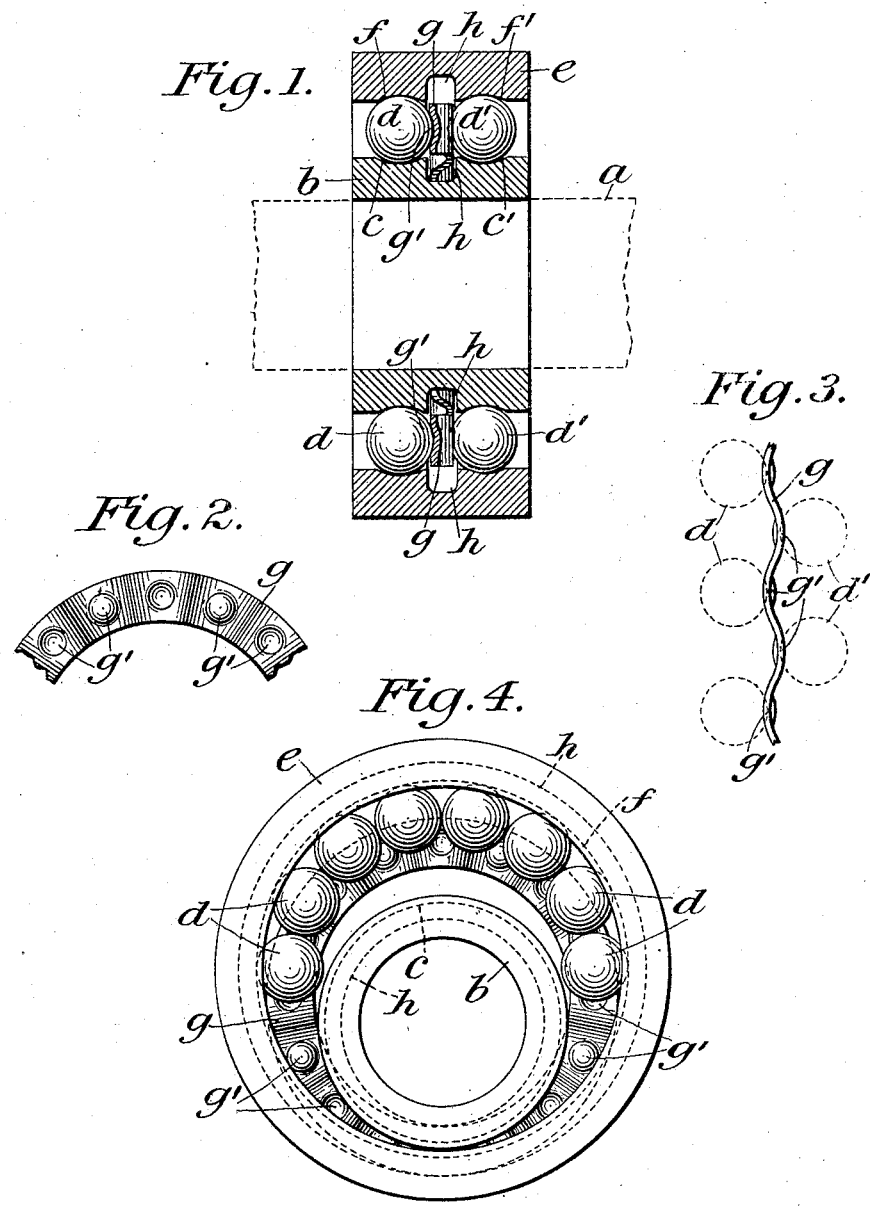

CARL ALBERT HIRTH, OF CANNSTATT, GERMANY, ASSIGNOR TO ERNST GUSTAV HOFFMANN, OF TOMPKINSVILLE, NEW YORK.

BALL-BEARING.

No. 796,649.     Specification of Letters Patent.     Patented Aug. 8, 1905.

Application filed December 9, 1904. Serial No. 236,138.

*To all whom it may concern:*

Be it known that I, CARL ALBERT HIRTH, engineer, a subject of the German Emperor, and a resident of Pragstrasse, Cannstatt, in the Empire of Germany, have invented certain new and useful Improvements in Ball-Bearings, of which the following is a specification, reference being had to the accompanying drawings, forming a part hereof.

This invention relates generally to what are well known in the art as closed ball-bearings of the two-point contact type, with the lines of contact in a plane at right angles to the axis of the shaft—that is to say, ball-bearings in which both the cone and the cup are formed each in one integral piece without any movable gate or any pass or aperture to provide for the insertion of the balls—the assembling of said closed ball-bearings being effected in an obvious and the only manner by displacing the cone eccentrically within the cup, introducing the balls in a space of maximum width between the cone and the cup, distributing the balls and simultaneously restoring the cone to its concentric position, and introducing separators to maintain the proper distribution of the balls. Obviously the number of balls which can thus be inserted in a closed bearing is only about one-half the number which could be accommodated between the cup and the cone. Therefore, while the advantages of such closed bearings in point of simplicity, compactness, absence of parts, which might be broken or be lost, and minimum expenditure of labor in machining have been generally recognized, such bearings have had but a limited use, because of the reduced number of balls which can be employed, whereby the load is sustained by perhaps only one or two balls, and because of the lack heretofore of a proper separator to maintain the necessary distribution of the balls.

It is accordingly the object of this invention to provide an improved bearing of this old and well-known type in which the advantages of a closed bearing shall be retained, while at the same time provision is made for distribution of the load between a greater number of balls. Furthermore, an improved separator is provided which, although primarily designed for use in the improved bearing combining the maximum number of balls, can nevertheless be employed advantageously in the old form of closed bearing in which the minimum number of balls is employed.

The invention will be more fully described hereinafter with reference to the accompanying drawings, in which for purposes of explanation and illustration of the nature of the invention one convenient embodiment thereof is shown.

In the drawings, Figure 1 is a view in sectional elevation of a shaft-bearing which embodies the invention. Fig. 2 is a detail view, in side elevation, of a portion of the separator. Fig. 3 is an edge view of the same. Fig. 4 is an end view of the bearing shown in Fig. 1 with the cone and separator displaced for the insertion or removal of the balls.

In the embodiment of the invention represented in the drawings a shaft $a$ is represented as provided with a cone $b$, having therein a plurality of tracks, as $c$ and $c'$, to receive a plurality of series or circumferential rows of balls $d$ and $d'$. Whether the tracks be formed as single grooves accommodated to the balls or as cylindrical bearing-surfaces limited at their outer margins, respectively, by a shoulder is immaterial so far as the present invention is concerned. The cup $e$ in the embodiment of the invention shown is likewise provided with a plurality of tracks $f$ and $f'$ of a suitable character, as in the case of the tracks provided in the cone.

As thus far described the features of the bearing so far as a single row of balls is concerned may not differ materially from the corresponding features of the ordinary closed bearing. In the accomplishment of one object of the invention, however—that is, the distribution of the load over a greater number of balls than is possible in the ordinary closed bearing—the provision of a plurality of rows of balls is essential. It is also essential in the accomplishment of this particular object that the balls of the several rows or series shall be distributed and maintained in staggered relation. In accordance with the invention, therefore, not only is a plurality of rows or series of balls provided, but means for maintaining the balls of such rows or series in staggered relation are also provided. It will be obvious that various means might be devised for this purpose; but the requirements of the case are well met by the means shown in the drawings, such means comprising a resilient ring $g$, which in the case illustrated is placed between the two series of balls $d$ and $d'$ and is formed to engage such balls in the axis of rotation thereof. As shown, the ring is slightly cupped, as at $g'$, from opposite sides in alternation, whereby depressions are formed to receive the balls. Since the function of this ring is to maintain the proper distribution of the balls and incidentally to guide the balls, it should exert a yielding pressure upon the balls of both series, such yielding pressure being resisted through the balls by the outer shoulders of the ball-tracks in the cup or in the cone, or in both. For convenience in the attainment of this result in such a bearing as that represented in the drawings the separator-ring is preferably given a wavy form, as clearly shown in Fig. 2, and the cups or depressions $g'$ therein are formed at the summits of the waves, so that when the parts are assembled the balls of the two series shall be pressed lightly in opposite directions with a yielding pressure.

It is obviously necessary in assembling the improved bearing that the ring-like separator, which has a width slightly less than the width of the space between the cup and the cone when concentric, shall also be capable of eccentric displacement, that it may be properly engaged with the balls and also that it may not interfere with the eccentric displacement of the cone. To permit this, a recess $h$ may be formed in the cone or in the cup, or in both. As shown in the drawings, for convenience in manufacture the recess is formed partly in the cup and partly in the cone, as an annular groove in each, so that it may receive the separator when the cone is eccentrically displaced, as indicated in Fig. 4.

So far as concerns the maintenance of the proper distribution of the balls of one row or series it is evident that the balls of the other row or series serve as an abutment for the separator. It will therefore be evident also that the improved separator can be used to advantage in a closed bearing of the old type.

The mode of assembling the improved bearing is natural and obvious, as in the case of the old type of bearing. When the cone and cup are concentric, the separator is introduced between them, and then the cone is displaced eccentrically, as shown in Fig. 4, and the balls are introduced through the space of maximum width between the cone and the cup on both sides of the separator until on each side the maximum number of balls have been introduced, the same being usually one more than half of the total number of balls which might be accommodated in the track. Then with the fingers or a proper instrument the balls are distributed and engaged with the separator as the cone is restored to its concentric position. When this position is attained and the balls are properly distributed, the separator will maintain the balls in their proper relative positions and in the case of a bearing having a plurality of rows of balls with the balls of the several rows in staggered relation. Through such disposition of the balls, as will be evident, the load is distributed over as great a number of balls in the two sets as would be possible in the case of an open bearing having its race filled with balls. It will be obvious also that in many cases the distribution of the points of contact in two or more lines will be of practical advantage. At the same time all of the advantages of the usual type of closed bearings are retained.

It will be clear that the invention is capable of embodiment in many different forms and that therefore it is not to be restricted to the precise construction and arrangement of parts shown and described herein.

I claim as my invention—

1. A closed ball-bearing comprising a plurality of rows or sets of balls and a separator between adjacent rows to engage the balls thereof and maintain the balls in staggered relation.

2. A closed ball-bearing comprising a plurality of rows or sets of balls and a ring-like, resilient separator placed between adjacent rows or sets of balls and engaging the same with a yielding pressure.

3. A ball-bearing comprising a cup and a cone, the one of said parts having a shoulder to limit the longitudinal movement of the balls, a resilient ring-like separator engaging the balls with a yielding pressure and maintaining the distribution thereof, and an abutment for said separator.

4. A ball-bearing comprising a cup and a cone, the one of said parts having a shoulder to limit the longitudinal movement of the balls, a wavy, ring-like, resilient separator engaging the balls at its summits with a yielding pressure and an abutment for said separator.

5. A closed ball-bearing comprising a cup, a cone, balls, and a ring-like separator engaging the balls, one of the two first-named parts being formed with a recess to permit eccentric displacement of the separator.

This specification signed and witnessed this 8th day of December, A. D. 1904.

CARL ALBERT HIRTH.

In presence of—
ANTHONY N. JESBERA,
W. B. GREELEY.